United States Patent
Yang et al.

(10) Patent No.: US 8,929,377 B2
(45) Date of Patent: Jan. 6, 2015

(54) SYSTEMS AND METHODS FOR AUTOMATIC RACK DETECTION

(75) Inventors: Shuo Yang, Fremont, CA (US); Stephen Kwok-Fai Wong, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 60 days.

(21) Appl. No.: 13/407,614

(22) Filed: Feb. 28, 2012

(65) Prior Publication Data

US 2012/0236761 A1 Sep. 20, 2012

Related U.S. Application Data

(60) Provisional application No. 61/452,963, filed on Mar. 15, 2011.

(51) Int. Cl.
*H04L 12/28* (2006.01)
*H04L 29/12* (2006.01)

(52) U.S. Cl.
CPC .................................. *H04L 61/103* (2013.01)
USPC .......................................... 370/392; 370/401

(58) Field of Classification Search
USPC ........................... 370/389, 386, 254, 401, 259
See application file for complete search history.

(56) References Cited

U.S. PATENT DOCUMENTS

| | | | |
|---|---|---|---|
| 2009/0303880 A1* | 12/2009 | Maltz et al. | 370/235 |
| 2010/0031258 A1* | 2/2010 | Takano et al. | 718/1 |
| 2010/0306408 A1* | 12/2010 | Greenberg et al. | 709/238 |
| 2012/0131225 A1* | 5/2012 | Chiueh et al. | 709/246 |

OTHER PUBLICATIONS

Ghemawat, S., et al., "The Google File System," SOSP '03, Oct. 19-22, 2003, Bolton Landing, NY, pp. 29-43.
Krevat, E, et al., "Applying Performance Models to Understand Data-Intensive Computing Efficiency," CMU-PDL-10-108, May 2010, Pittsburgh, PA, 19 pages.
"Xen," http://www.xen.org, Nov. 4, 2011, 4 pages.
"Transform Your Business with Virtualization," http://www.vmware.com/virtilization/what-is-virtualization.html, Nov. 4, 2011, 2 pages.
"You Manage Your Business. We'll Manage Your Cloud," http://www.rackspacecloud.com/index.php, Nov. 4, 2011, 3 pages.
Neiger, G. et al., "Intel® Virtualization Technology: Hardware Support for Efficient Processor Virtualization," http://www.intel.com/technology/itj/2006/v10i3/1-hardware/7-architecture-usage.htm, Nov. 4, 2011, 17 pages.

(Continued)

*Primary Examiner* — Dady Chery
(74) *Attorney, Agent, or Firm* — Slater & Matsil, L.L.P.

(57) ABSTRACT

An embodiment system and method to provide rack awareness for a virtual machine running on a data center server. The virtual machine sends an address resolution protocol request message to a top-of-rack switch to identify a MAC address of the server physical port. The virtual machine receives a reply containing the MAC address of the top-of-rack switch physical port. The virtual machine sends an ICMP packet to the top-of-rack switch with a pre-selected un-routable IP address using the identified physical port MAC address. The virtual machine then receives a message from the top-of-rack switch providing a top-of-rack IP address. The virtual machine employs the top-of-rack IP address to identify the rack location of the server.

20 Claims, 3 Drawing Sheets

(56) References Cited

OTHER PUBLICATIONS

"Welcome to Apache™ Hadoop™ !," http://hadoop.apache.org, Nov. 4, 2011, 3 pages.

"AMD Virtulization," http://sites.amd.com/us/business/it-solutions/virtulization/Pages/amd-v.aspx, Nov. 4, 2011, 2 pages.

"Amazon Elastic Compute Cloud (Amazon EC2)," http://aws.amazon.com/ec2/, Nov. 4, 2011, 34 pages.

Apache Hive, Apache Software Foundation, https://cwiki.apache.org/confluence/display/Hive/Home, retrieved Mar. 6, 2012, 3 pages.

White, Tom, "Hadoop the Definitive Guide," $2^{nd}$ Edition, O'Reilly Media, Inc., Oct. 2010, pp. 64-65.

* cited by examiner

SYSTEMS AND METHODS FOR AUTOMATIC RACK DETECTION

This application claims the benefit of U.S. Provisional Application No. 61/452,963, filed on Mar. 15, 2011, entitled "Systems and Methods for Automatic Rack Detection," which application is hereby incorporated herein by reference.

TECHNICAL FIELD

The present invention relates to computer servers and methods, and, in particular embodiments, to a system and method for automatic rack detection for a virtual machine running on a server.

BACKGROUND

The emergence of virtualization technology as a core backbone infrastructure for a variety of cloud deployments is well known. Over the last ten years, advances in processor hardware assists have paved the way for performance and machine scalability focused on virtualization solutions. Hypervisors have been developed to provide a software instruction intercept mechanism to emulate CPU, memory, and input/output resources to enable a plurality of operating systems ("OSs") to run as guests. Properly written, virtualization technology can provide reliable, secure, and accurate virtual computing resources to a guest OS. This can be used to leverage modern architectural features of recent operating systems running under virtualized hardware. Server virtualization can be further classified into processor, network, and storage virtualizations.

The combination of virtualization and cloud computing has resulted in widely displaced commodity processors and memory that are able to provide powerful, economical, and reliable computing resources. However, the result of widely displaced resources has been a corresponding need for substantial bandwidth between computing elements and inefficiencies resulting from their physical separation.

The ability to provide more efficient use of virtualization and cloud computing would answer an important market need.

SUMMARY OF THE INVENTION

Embodiments provide a high-performance virtualized appliance that can be used, for example, in a Hadoop operating system environment.

Various embodiments have benefits such as increased processing capability with open source software and easy system manageability. Improved manageability is provided for a large scale deployment, providing near native computing performance.

An embodiment system for a virtual machine ("VM") to identify a server in a data center is formed with a plurality of servers in a rack with a top-of-rack ("TOR") switch. The data center is configured to support a plurality of virtual machines running on a plurality of servers. A hypervisor layer operates in at least one of the servers in each rack. A virtual machine sends an address resolution protocol ("ARP") request message to the top-of-rack switch to identify a media access control ("MAC") address of a physical port to which the server is connected. The virtual machine receives a message from the TOR switch in response to the ARP request message containing the MAC address of the physical port of the TOR switch to which the server is connected. The virtual machine sends a packet to the TOR switch with a pre-selected un-routable Internet protocol ("IP") address using the identified MAC address of the physical port. Virtual machine then receives a message from the TOR switch providing a TOR IP address in response to the packet. The TOR IP address is employed to identify the rack location of the server.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
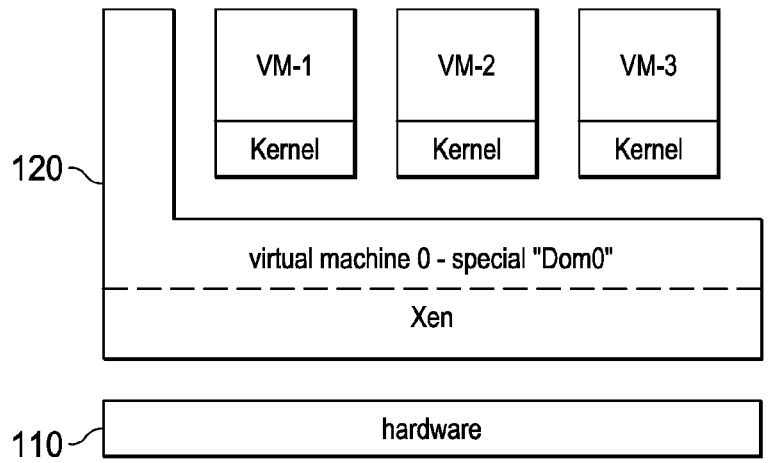
FIG. 1 illustrates a drawing showing software layers for a para-virtualization technology, illustrating an environment for application of the principles of an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In an embodiment, a virtual machine employs a tuple (unique rack ID, physical machine) to detect its physical location in a network/data center. Address resolution protocol response information is employed to detect whether two machines are physically attached to a same TOR switch. The MAC address of the physical machine is used to identify the physical machine. Detection of this information can be automatically achieved. With the above mechanism, each VM can detect its physical network location in a self-organized way.

By enabling automatic detection of the physical configuration of a virtual machine, particularly for execution of a topology-aware application, manageability of virtual machines in a data center can be substantially improved. The solution can help a user to define the network topology function and enable an application running on the virtual machine to be self-organized so that a configured network topology rule can be respected.

In a modern data center, allowing a server to automatically detect its current relative rack location can significantly benefit scheduling of computational tasks, management of network topology, and other scenarios. Computational tasks could be advantageously scheduled taking into account the physical proximity of servers that would execute or host the tasks, particularly when the tasks exchange a lot of data.

For an example of an environment in which tasks are executed on physically separated servers, the Apache Hadoop operating system provides an open source operating system implementation that accommodates the redundantly dispersed Google File System ("GFS"), as described by Sanjay Ghemawat, Howard Gobioff, and Shun-Tak Leung, in the paper entitled "The Google File System," Proc. 19th Symposium on Operating Systems Principle, Lake George, N.Y., October, 2003. The GFS is widely used for data mining and data warehousing. Hive is an example of a physically dispersed data warehouse infrastructure built on top of Hadoop. Hadoop requires rack-awareness to efficiently process stored data, as described by Tom White, in the book entitled "Hadoop: The Definitive Guide, Second Edition," O'Reilly Media, 2010. These publications are hereby incorporated herein by reference.

With the increase of computational resources relying on physically dispersed commodity servers, virtualization technology has gained more and more ground and has become the de-facto technology in data centers as described on the Internet by VMWare Inc., in the Internet article entitled "Transform your Business with Virtualization," at http://www.vmware.com/virtualization/what-is-virtualization.html, which is hereby incorporated herein by reference.

The tuple (unique rack identifier ("ID"), physical machine) defines exactly a virtual machine's network location in a data center. As introduced herein, a new layer-2 rack-location detection approach is employed so that each virtual machine in a data center can automatically detect the TOR (Top-of-Rack) switch (or the group of TOR switches in an HA setup) that it has been attached to, and the physical machine that hosts it, so that the above tuple can be employed to identify a virtual machine's physical network location.

One fundamental requirement that many modern applications use is knowledge of the relative physical locations, hereafter termed "network proximity," in which different application processes are executed. Knowledge of network proximity helps determine total bandwidth and the latency cost of moving data from one node to another node during execution of an overall process, as well as providing information to calculate availability of data from one node to another node. Enterprise applications and data intensive scalable computing ("DISC"), as described by Elie Krevat, Tomer Shiran, Eric Anderson, Joseph Tucek, Jay J. Wylie, and Gregory R. Ganger in the article entitled "Applying Performance Models to Understand Data-intensive Computing Efficiency," Carnegie Mellon University Parallel Data Lab Technical Report CMU-PDL-10-108, May 2010, ("Krevat") which is hereby incorporated herein by reference, is concerned about bandwidth and latency costs. But in Krevat the problem is discussed only from a bandwidth/latency cost perspective. As introduced herein, an embodiment determines and manages bandwidth and latency costs when virtual machines are deployed in a data center.

Virtualization is the technology generally used to provide a hardware consolidation mechanism. Virtualization is supported by the open source industry standard for machine virtualization, Xen, as described on the Internet at http://www.xen.org/, which is hereby incorporated herein by reference.

Nowadays, with the increase of computational resource in modern commodity servers, virtualization technology has gained more and more ground. In particular, para-virtualization gives near native performance for instruction execution. Para-virtualization refers to a technique that presents a software interface to a virtual machine that is similar to that of underlying hardware. Para-virtualization technology can take advantage of virtualization-enabled hardware assistance to boost performance. Hardware vendors such Intel and AMD are embracing virtualization technologies, as described for the Intel VT-x series on the Internet at http://www.intel.com/technology/itj/2006/v10i3/1-hardware/6-vt-x-vt-i-solutions.htm, and for the AMD V series, on the Internet at http://sites.amd.com/us/business/itsolutions/virtualization/Pages/amd-v.aspx, both of which documents are hereby incorporated herein by reference.

Turning now to FIG. 1, illustrated is a drawing showing software layers for a typical para-virtualization technology operating above a hardware layer, illustrating an environment for application of the principles of an embodiment. In FIG. 1, the underlying machine hardware layer is represented by the block 110. The operating system layer, block 120, includes two parts, a Xen "hypervisor" layer and a Domain0 layer. The Xen hypervisor layer is the virtualization software layer that provides services to allow multiple computer operating systems to execute concurrently on the same computer hardware. The Xen "hypervisor" is the lowest virtualization software layer, which supports one or more guest operating systems such as Unix, Windows, etc. The first guest operating system, referred to as Domain 0 ("Dom0") is the "virtual machine 0—special" layer. Dom0 provides an administrative domain and generally receives special management privileges and direct access to all physical hardware.

Several virtual machines, VM-1, VM-2, and VM-3, and their associated kernel operate above block 130. A kernel is the main component of an operating system, which operates as a bridge between applications and the actual data processing done at the hardware level. The virtual machines have multiple network interfaces, but the hardware may have only two physical ports to the outside world. The Xen level maps what each virtual machine sees as a virtual port into a hardware physical port.

Virtual machines are now widely deployed in enterprise data centers, and the same trend follows in the enterprise private cloud. Moreover, virtual machines are widely used in public cloud solutions, as described for Amazon EC2 on the Internet at http://aws.amazon.com/ec2/, and by Rackspace on the Internet for hosting a machine on the cloud at http://www.rackspacecloud.com/index.php. Both of these publications are hereby incorporated herein by reference.

Virtual machines provide various advantages. First, at the virtual machine level, data transfers across VMs running on the same physical machine are "cheap" because they are not necessarily limited by a physical network interface card ("NIC"). In other words, data transfer between VMs on the same physical machine can be efficiently bridged directly to each other. On the other hand, data transfer bandwidth across VMs running on different physical machines is limited by NIC bandwidth.

Second, at a physical server level, data transfers across nodes attached to the same top-of-rack ("TOR") switch are considered to be an inexpensive operation because a TOR switch generally has a much more inexpensive per-port cost, and therefore can be over-engineered to support a full data rate, or at an extremely low oversubscription ratio, in addition to minimal latency for data transfer. On the other hand, data transfer bandwidth across nodes attached to different racks uses bandwidth between TOR switches and a higher hierarchy network device, generally called an access router ("AR"). An oversubscription ratio of an AR is often a magnitude higher than that of a TOR switch. Data transfers across different racks are thus much more costly, both economically and from the perspective of bandwidth and latency.

Considering the above two levels of network proximity, i.e., on the same physical machine or on different machines that are attached to the same TOR switch, an embodiment automatically detects where a VM is physically located.

Figure 2:
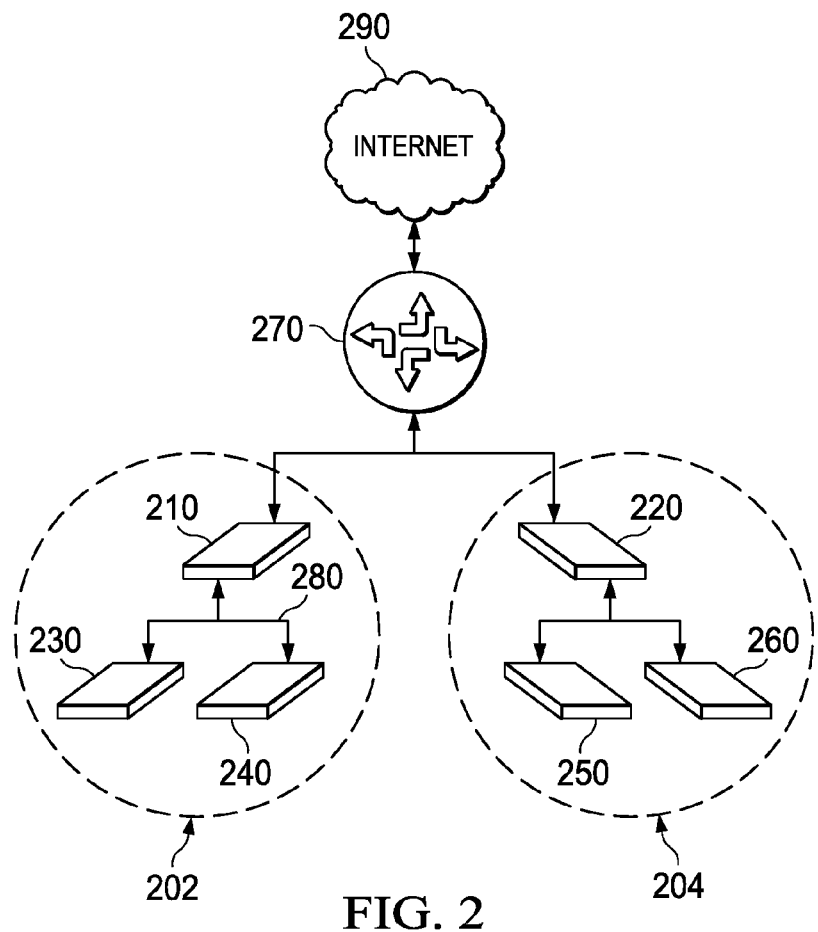
FIG. 2 illustrates a drawing of a hardware arrangement showing servers and top-of-rack switches in a data center deployment, illustrating an environment for application of the principles of an embodiment.

Turning now to FIG. 2, illustrated is a drawing of a hardware arrangement showing servers and top-of-rack switches in a data center deployment, illustrating an environment for application of the principles of an embodiment. FIG. 2 illustrates VMs running on physical servers 230, 240, 25, and 260 for execution of applications in a data center deployment, where the VMs run on different physical servers and where each physical server is connected to a specific TOR switch, such as TOR switches 210, 220. The group of servers 230, 240 and the top of rack switch 210 represent one physical rack, 202. The group of servers 250, 260, and the top of rack switch 220 represent another physical rack, 204. There can be many physical racks in a data center. The connections, such as the connection 280, between the physical servers 230, 240, 25, and 260 and their respective TOR switch are physical connections. The connections between a TOR switches and the access router 270 are also physical connections. Each TOR switch is connected, as is often the case, to the next-level access router 270 or switch with various connection strategies for redundancy and bandwidth consideration. The access router 270 provides a bidirectional connection to the Internet represented by the block 290. In FIG. 2, only a simple connection for each TOR switch is shown to simplify the diagram.

The servers 230, 240, 25, and 260 have a virtual software switch.

Next, an application is described to illustrate issues related to network physical proximity in a data center. In a Hadoop-configured arrangement, as described in the Apache Hadoop Online Document on the Internet at http://hadoop.apache.org/, which is hereby incorporated herein by reference, data is replicated in multiple copies across different physical machines, where a typical replication factor is three or more.

A data placement policy under a replication factor of three operates as follows. After a first storage server (called a "Datanode server") stores a block of data onto its local disk, the same block of data is replicated on a machine attached to a different TOR switch for a second copy to assure that the data is independently available on different physical machines and under different TOR switches. This block of data is replicated again on a machine attached to the same TOR switch to which the machine holding the second copy of data is connected. The purpose and location of this further copy is to reduce rack-to-rack traffic and to provide further redundancy.

Figure 3:
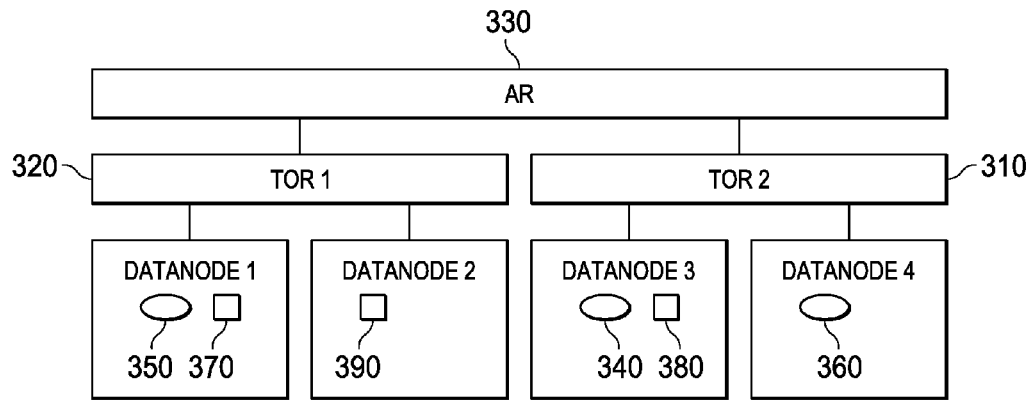
FIG. 3 illustrates a system drawing showing a data replication strategy, illustrating an environment for application of the principles of an embodiment.

Turning now to FIG. 3, illustrated is a system drawing showing a data replication strategy of three, illustrating an environment for application of the principles of an embodiment. The system illustrated in FIG. 3 is formed with access router 330 coupled to top-of-rack switches 310, 320, which in turn are coupled to Datanode1, Datanode2, Datanode3, and Datanode4, each representing a physical server in which a block of data is stored and can be processed. In the system illustrated in FIG. 3, the second copy of the block of data is remotely stored, and the third copy is stored nearby. The first copy of the block of data is represented by the ellipse 340 on Datanode3. The second copy 350 of the block of data is copied to a machine connected to a different TOR and third copy 360 is copied to a machine located under the same TOR as the first copy 340. Similarly, the first copy of another block of data represented by the square 370 in FIG. 3 is on Datanode1, and the remaining replicas 380, 390 are deployed following the replication strategy of the "second copy going remote, and the guard copy going nearby."

In the system represented in FIG. 3, a process such as an Internet search can be performed concurrently on many servers, each accessing a copy of data to be searched that is replicated among many nodes. Each data node may search only a portion or all of the data for purposes of high availability. One datanode finally sorts partial results produced and exchanged by the other datanodes.

The Hadoop data replication mechanism has been described to illustrate why the network proximity detection mechanism introduced herein is relevant to current data centers.

A VM determines its physical network position which is defined by the tuple (unique rack ID, physical machine).

To detect whether two VMs are hosted by servers located on the same rack, two scenarios are considered. In a data center, there can be numerous racks of servers, each rack holding, perhaps, 40 servers. Recognizing that each server can be constructed with multi-core processors, a server can support, perhaps, 20 or 40 VMs. Thus, the problem is to determine if a software process is run on two (or more) VMs whether the two (or more) VMs are run on the same server or on physically separated servers. If two VMs are run on the same physical server, and if Dom0 can make that determination, the data exchange process between the two VMs can be performed very efficiently. To this end, the rack ID and physical location of each VM in the rack are determined by the Dom0.

In a first scenario there is either one TOR switch per rack, or two TOR switches including a master switch and a 100% standby switch for the master switch. In this first scenario, a process is employed wherein about 90% of an inexpensive level-2 ("L2") switch is used for a TOR switch. The process is modified as described hereinbelow when there are two independent TOR switches in the same rack.

Figure 4:
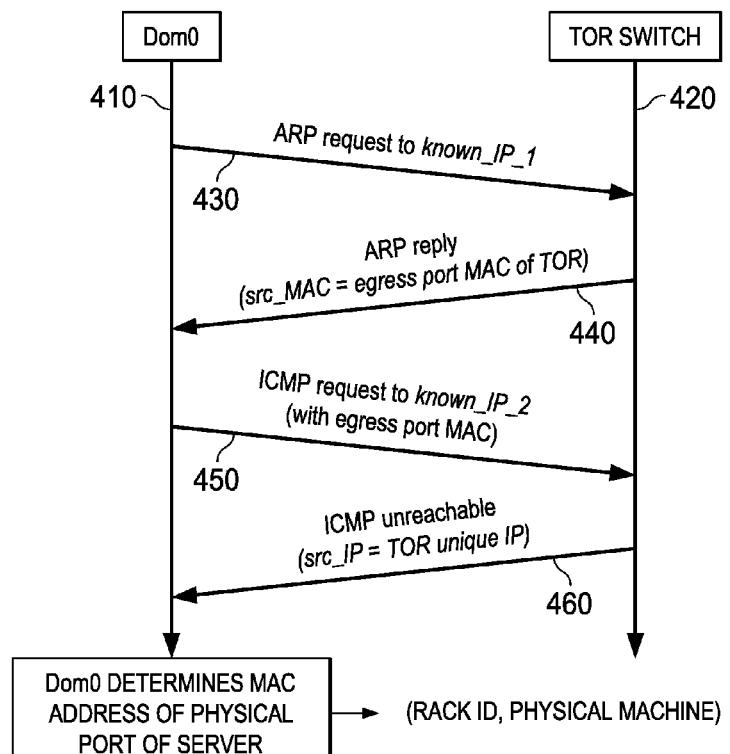
FIG. 4 illustrates a processes to provide rack awareness, in accordance with an embodiment.

Referring now to FIG. 4, illustrated is a process to provide rack awareness and physical switch identity for a rack equipped with a single or plural TOR switches, illustrating an embodiment.

When two VMs attempt to determine whether they are under the same physical rack, they acquire and compare the unique rack ID from the individual hypervisors on which they are located. This provides the first part of the tuple (unique rack ID, physical machine).

The process 410 in FIG. 4 represents Dom0, which includes the hypervisor level run on a server, represented in FIG. 1 by block 120. Each TOR switch such as TOR switch 420 is pre-configured with two well-known IP addresses. The first, which is not unique and bound to the TOR switch, is set on a loopback interface on all TOR switches and is non-routable, i.e., a data packet with that IP address is not intended to leave the rack, and is not intended to be routed in the data center transport network. The second is a pre-selected un-routable IP address as described further hereinbelow. All TOR switches have the first IP address, which is a common, well-known IP address, and packets associated with this IP address are not accepted by any switch. Any switch with the first IP address recognizes that this IP address is bound to that switch. If there are multiple independent TOR switches per rack wherein different servers on the same rack can connect to different TOR switches, then both TOR switches can be bound to the same IP address. The result of switch identification for plural switches is the same because the plural TOR switches are located in the same rack.

When the Dom0/hypervisor 410 of a server first comes up, it sends an address resolution protocol ("ARP") request message 430 inquiring a destination media access control ("MAC") address of the physical port to which the server is connected. The ARP request message 430 requests the MAC address of the first well-known IP address, and its destination MAC is the common broadcast MAC address 0xFFFFFFFFFFFF, shown on FIG. 4 as IP_1. Since all network traffic from a server on a rack goes through the associated TOR switch, that TOR switch, 420, definitely receives the ARP request. Since the first well-known IP address is bound to the TOR switch loopback interface, the TOR switch sends ARP reply 440 back to Dom0/hypervisor 410 containing the MAC address of the connected port of the TOR switch back to the Dom0 server. The MAC address in reply 440 is a physical port address identifying "src_MAC=egress port MAC of TOR" (the source MAC address of the ARP reply is the TOR physical egress port MAC address), thereby informing Dom0 of the particular physical port to which the TOR switch is connected. A TOR switch may have, for example, 48 ports to the outside world to which each of its many servers in the rack are connected. Dom0 can thus acquire the MAC address of the TOR switch's egress port via the ARP reply.

When there are two independent TOR switches in the same rack, they can each be identified or otherwise distinguished later by their unique MAC address.

Dom0 then sends an ICMP packet in message 450 (a "ping"/ICMP echo request would suffice) to the second IP address, a well-known pre-selected, un-routable IP address, i.e., well-known to all TOR switch as an address to reject, with the destination MAC as the TOR MAC address just received from the first step. The second pre-selected un-routable IP address is pre-configured on the access control list ("ACL") of all TOR switches that a TOR switch should reject. An ACL specifies which users or system processes are granted access to particular objects, as well as what operations are allowed on particular objects. When such a packet is received on the TOR switch, it will move up to the Internet protocol ("IP") layer, since the destination MAC is that of a local port, and that packet filter will reject the packet. The rule is that the TOR switch will send back an ICMP unreachable response. The response signals Internet control message protocol ("ICMP") unreachable error 460, i.e., the IP address is unreachable. The TOR switch includes in the response the message "scr_IP=TOR unique IP," thereby providing the source IP TOR-unique IP address. From the source IP address of this packet, Dom0 stores this packet's source IP address as the rack ID. At this point Dom0 knows which rack the server is on, i.e., the rack ID, but not the server itself. All ICMP packets from the same TOR switch would key on the same IP address irrespective of from which port packets arrive, assuming they are under the same virtual local area network ("VLAN").

Next, acquisition of the "physical machine" part of the tuple is described. There are a number of processes that can be employed to obtain the physical machine part of the tuple. The process described below serves as an example embodiment that is not intended to exclude other solutions.

VMs thus inquire of Dom0 to provide a list of the MAC addresses of all physical ports associated with the servers on which they are executing, which are controlled by Dom0.

For two VMs to work together in a distributed application scenario, they can compare their respective rack IDs, query the hypervisor/Dom0 to acquire a physical MAC address, and then use that MAC address as the "machine ID." When given the tuple (rack ID, machine ID) by the other VM, the first VM would first check if the other VM has the same rack ID. If the rack ID is the same, the first VM would then query its hypervisor/Dom0 to see if the machine ID (physical MAC address) of the other VM belongs to the same server. If so, the two VMs are running on the same server. Otherwise, they are just running on the same rack.

With the processes introduced above, network proximity of VMs can be determined. Information contained in a resolved tuple is used to determine physical location/proximity of VMs. For example, the logical statements $$\text{Dist}(A,B) = \text{RackDist}(A,B) + \text{MachineDist}(A,B)$$

$$\text{RackDist}(A,B) = 0 \text{ if } (\text{Rack}\_A\_\text{attached} = \text{Rack}\_B\_\text{attached}) = 1 \text{ if } (\text{Rack}\_A\_\text{attached} \neq \text{Rack}\_B\_\text{attached})$$

$$\text{MachineDist}(A,B) = 0 \text{ if } (\text{PhysicalMachine}\_A\_\text{run\_on} = \text{PhysicalMachine}\_B\_\text{run\_on}) = 1 \text{ if } (\text{PhysicalMachine}\_A\_\text{run\_on} \neq \text{PhysicalMachine}\_B\_\text{run\_on})$$

can be employed to determine a distance "Dist" between two servers supporting VMs (A and B). "RackDist" for VMs A and B indicates whether the two VMs are operating in the same rack. "MachineDist" for VMs A and B indicates whether the two VMs are operating in the same server. Distance can thus be calculated to indicate whether two VMs are running on the same rack, and if they are indeed running on the same server. The resulting distance calculation enables a preference on availability (if Dist is 2) or performance (if Dist is 0).

For distributed processing applications such as Hadoop, physical proximity information is helpful to manage a cluster and provides locality aware application data hosting.

A number of potential applications are enabled employing an embodiment as described herein. For example, Hadoop can employ an embodiment to automatically achieve rack-awareness without manually configuring network topology. Hadoop can run on a virtualized data center without losing its physical machine failure resilience.

Figure 5:
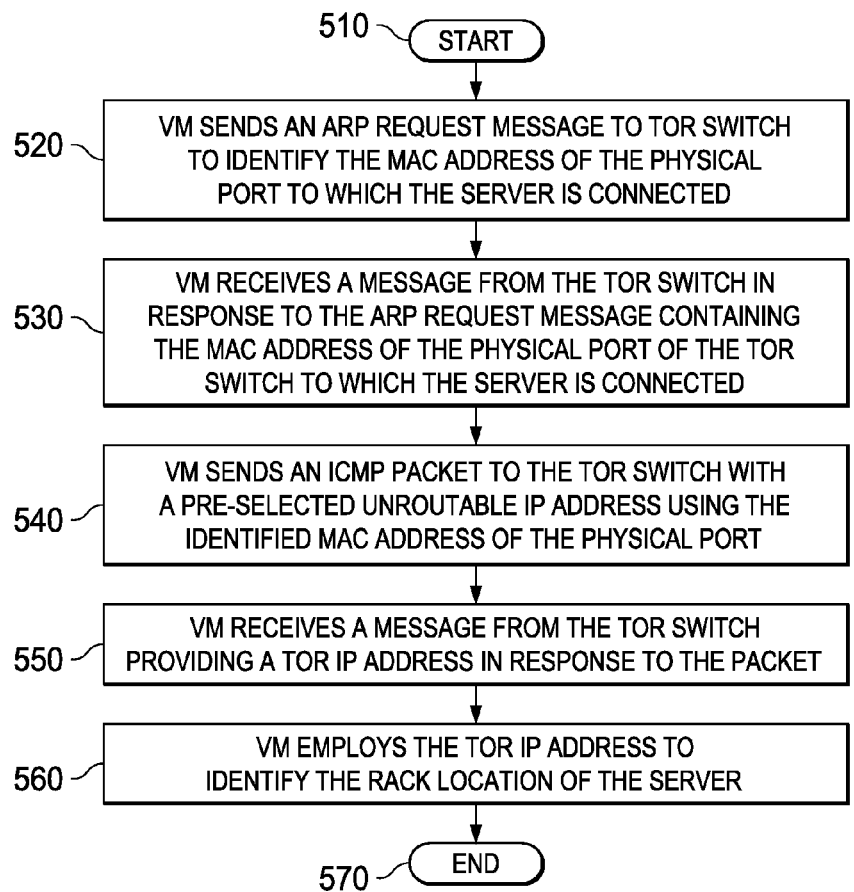
FIG. 5 illustrates a graphical representation of a method to provide rack awareness, according to an embodiment.

Turning now to FIG. 5, illustrated is a graphical representation of a method to provide rack awareness for a VM running on a server in a data center, according to an embodiment. The data center is configured to run a plurality of virtual machines on a plurality of servers. The method functionally begins in a step or module 510. In step or module 520, the VM sends an ARP request message to a TOR switch to identify a MAC address of the physical port to which the server is connected. The hypervisor software level may be employed for sending the ARP request message. The ARP request message is generally destined to layer 2 broadcast address 0xFFFFFFFFFFFF. In step or module 530, the VM receives a message from the TOR switch in response to the ARP request message containing the MAC address of the physical port of the TOR switch to which the server is connected. In step or module 540, the VM sends an ICMP ("ICMP") packet to the TOR switch with a pre-selected un-routable IP address using the identified MAC address of the physical port. The packet may include an Internet control message protocol request. The packet may include an ICMP echo request to the pre-selected un-routable IP address. The pre-selected un-routable IP address may be pre-configured on an access control list ("ACL") that the TOR switch should reject. In step or module 550, the VM receives a message from the TOR switch providing a TOR IP address in response to the packet. The TOR IP address received in response to the packet may be embedded in an ICMP reply. And in step or module 560, the VM employs the TOR IP address to identify the rack location of the server. The VM may employ the TOR IP address and a list of MAC addresses of physical machines to identify the server. An initialization script installed in a hypervisor software level may be used to obtain the list of the MAC addresses of the physical machines. The hypervisor software level employs the TOR MAC address to determine a physical port of the server to identify the server. The method functionally ends in step or module 570.

Although embodiments described herein may employ a cloud-oriented operating system such as Hadoop, is also contemplated that other operating systems such as Unix or Windows may be employed within the broad scope of the present invention.

It is noted that, unless indicated otherwise, functions described herein can be performed in either hardware or software, or some combination thereof, with or without human intervention. In an embodiment, the functions are performed by a processor such as a computer or an electronic data processor, such as that discussed below with reference to FIG. 6, in accordance with code such as computer program code, software, and/or integrated circuits that are coded to perform such functions, unless indicated otherwise.

Figure 6:
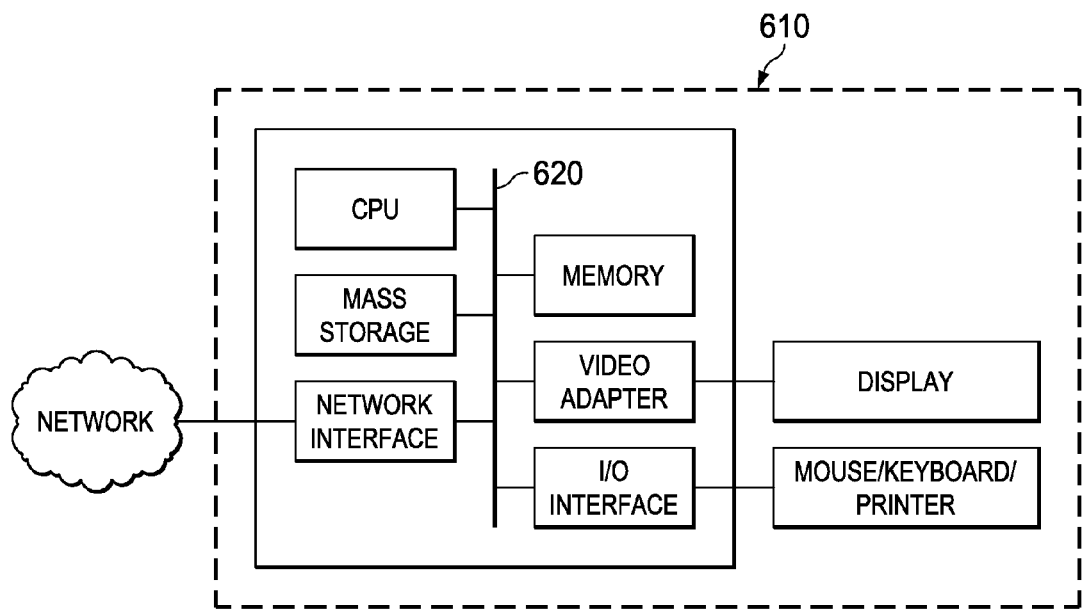
FIG. 6 illustrates a block diagram of elements of a processing system that may be used to perform one or more of the processes introduced herein.

Turning now to FIG. 6, illustrated is a block diagram of elements of a processing system that may be used to perform one or more of the processes discussed above. The processing system may comprise a processing unit 610 equipped with one or more input/output devices, such as a mouse, a keyboard, printer, or the like, and a display. The processing unit 610 may include a central processing unit (CPU), memory, a mass storage device, a video adapter, a network interface, and an I/O interface connected to a bus 620.

The bus 620 may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for data storage for use while executing programs.

The mass storage device may comprise any type of storage device configured to store data, programs, and other information and to make the data, programs, and other information accessible via the bus. The mass storage device may comprise, for example, one or more of a hard disk drive, a magnetic disk drive, an optical disk drive, or the like.

The video adapter and the I/O interface provide interfaces to couple external input and output devices to the processing unit. Examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also preferably includes a network interface, which may be a wired link, such as an Ethernet cable or the like, and/or a wireless link to enable communication with a network such as a cellular communication network. The network interface allows the processing unit to communicate with remote units via the network. In an embodiment, the processing unit is coupled to a local-area network or a wide-area network to provide communications to remote devices, such as other processing units, the Internet, remote storage facilities, or the like.

It should be noted that the processing system may include other components. For example, the processing system may include power supplies, cables, a motherboard, removable storage media, cases, and the like. These other components, although not shown, are considered part of the processing system.

As introduced herein, virtual machines thus detect their network location, which is defined by the tuple (unique rack ID, physical machine). ARP response information is employed to determine whether two physical machines are attached to a same TOR switch. The physical machine's MAC address is employed to identify the physical machine. All of the information detection is automatically achieved. With the processes described hereinabove, each VM detects its network location in a self-organized way.

Embodiments such as those presented herein provide a system and a method to provide rack awareness for a VM running on a server in a data center. The data center is configured to run a plurality of virtual machines on a plurality of servers. An embodiment method of providing rack awareness for a VM running on a server includes the VM sending an ARP request message to a TOR switch to identify a MAC address of the physical port to which the server is connected. The hypervisor software level may be employed for sending the ARP request message. The ARP request message is generally destined to layer 2 broadcast address 0xFFFFFFFFFFFF. In an embodiment, the method includes the VM receiving a message from the TOR switch in response to the ARP request message containing the MAC address of the physical port of the TOR switch to which the server is connected. In an embodiment, the method includes the VM sending an ICMP packet to the TOR switch with a pre-selected un-routable IP address using the identified MAC address of the physical port. The packet may include an Internet control message protocol ("ICMP") request. The packet may include an ICMP echo request to the pre-selected un-routable IP address. The pre-selected un-routable IP address may be pre-configured on an access control list ("ACL") that the TOR switch should reject. In an embodiment, the method includes the VM receiving a message from the TOR switch providing a TOR IP address in response to the packet. The TOR IP address received in response to the packet may be embedded in an ICMP reply. In an embodiment, the method includes the VM employing the TOR IP address to identify the rack location of the server. The VM may employ the TOR IP address and a list of MAC addresses of physical machines to identify the server. An initialization script installed in a hypervisor software level may be used to obtain the list of the MAC addresses of the physical machines. The method includes the hypervisor software level employing the TOR MAC address to determine a physical port of the server to identify the server.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. In a first virtual machine running on a processor in a server that is one of a plurality of servers making up a data center network, a method comprising:

sending, by the first virtual machine, an address resolution protocol ("ARP") request message to a top-of-rack ("TOR") switch to which the server is directly connected, to identify a media access control ("MAC") address of a physical port of the TOR switch;

receiving, by the first virtual machine, a first message from the TOR switch in response to the ARP request message containing the MAC address of the physical port of the TOR switch;

sending, by the first virtual machine, a packet to the TOR switch with a pre-selected un-routable Internet protocol ("IP") address using the MAC address of the physical port;

receiving, by the first virtual machine, a second message from the TOR switch providing a TOR IP address in response to the packet;

employing, by the first virtual machine, the TOR IP address to determine a rack identification (ID) of a rack that the server and TOR switch are on;

employing, by the first virtual machine, the TOR IP address and a list of MAC addresses of physical machines in the rack to determine a machine ID of the server;

identifying, by the first virtual machine, the first virtual machine's physical location in accordance with a first tuple of the rack ID and the machine ID; and determining, by the first virtual machine, a network proximity of the first virtual machine and a second virtual machine by comparing the first tuple with a second tuple of the second virtual machine.

2. The method as recited in claim 1 wherein the packet comprises an Internet control message protocol ("ICMP") request.

3. The method as recited in claim 1 wherein an initialization script installed in a hypervisor software level comprises the list of the MAC addresses of the physical machines.

4. The method as recited in claim 3 wherein the hypervisor software level is employed for the sending the ARP request message.

5. The method as recited in claim 1 wherein the ARP request message is destined to layer 2 broadcast address 0xFFFFFFFFFFFF.

6. The method as recited in claim 1 wherein a hypervisor software level determines a physical port of the server for identifying the server.

7. The method as recited in claim 1 wherein the pre-selected un-routable IP address is pre-configured on an access control list ("ACL") that the TOR switch should reject.

8. The method as recited in claim 1 wherein the packet comprises an ICMP echo request to the pre-selected un-routable IP address.

9. The method as recited in claim 1 wherein the TOR IP address received in response to the packet is embedded in an ICMP reply.

10. The method as recited in claim 1 wherein the determining the network proximity further comprises determining the first and second virtual machines are located on a same server when the first and second tuples match.

11. A server comprising a first virtual machine running on a processor, the server one of a plurality of servers making up a data center network, the first virtual machine configured to:

send an address resolution protocol ("ARP") request message to a top-of-rack ("TOR") switch to which the server is directly connected, to identify a media access control ("MAC") address of a physical port;

receive a first message from the TOR switch in response to the ARP request message containing the MAC address of the physical port of the TOR switch;

send an ICMP packet to the TOR switch with a pre-selected un-routable IP address using the MAC address of the physical port;

receive a second message from the TOR switch providing a TOR IP address in response to the packet;

employ the TOR IP address to determine a rack identification (ID) of a rack that the server and TOR switch are on;

employ the TOR IP address and a list of MAC addresses of physical machines in the rack to determine a machine ID of the server;

identify the first virtual machine's physical location in accordance with a first tuple of the rack ID and the machine ID; and determine a network proximity of the first virtual machine and a second virtual machine by comparing the first tuple with a second tuple of the second virtual machine.

12. The server as recited in claim 11 wherein the packet comprises an ICMP request.

13. The server as recited in claim 11 wherein an initialization script installed in a hypervisor software level comprises the list of the MAC addresses of the physical machines.

14. The server as recited in claim 13 wherein the hypervisor software level is configured to send the ARP request message.

15. The server as recited in claim 11 wherein the ARP request message is destined to layer 2 broadcast address 0xFFFFFFFFFFFF.

16. The server as recited in claim 11 wherein a hypervisor software level is configured to determine a physical port of the server for identifying the server.

17. The server as recited in claim 11 wherein the pre-selected un-routable IP address is pre-configured on an ACL that the TOR switch should reject.

18. The server as recited in claim 11 wherein the packet comprises an ICMP echo request to the pre-selected un-routable IP address.

19. The server as recited in claim 11 wherein the TOR IP address received in response to the packet is embedded in an ICMP reply.

20. The server as recited in claim 11 wherein the first virtual machine configured to determine the network proximity further comprises the first virtual machine configured to determine the first and second virtual machines are located on a same server when the first and second tuples match.

* * * * *